Oct. 12, 1971          A. R. GONZALEZ          3,611,458
BOAT CONSTRUCTION
Filed Sept. 3, 1969          12 Sheets-Sheet 1

Oct. 12, 1971     A. R. GONZALEZ     3,611,458
BOAT CONSTRUCTION
Filed Sept. 3, 1969     12 Sheets-Sheet 6
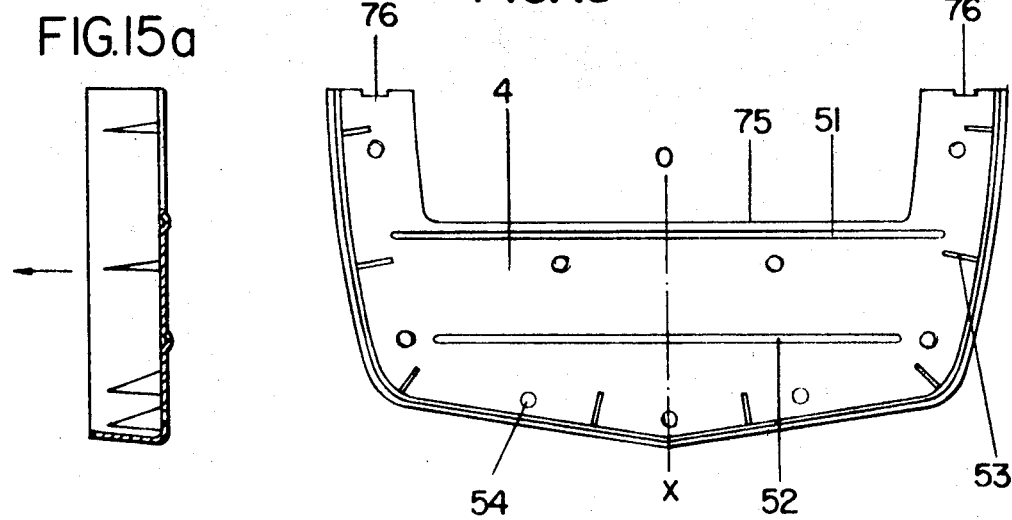
FIG. 15
FIG. 15a
FIG. 15b
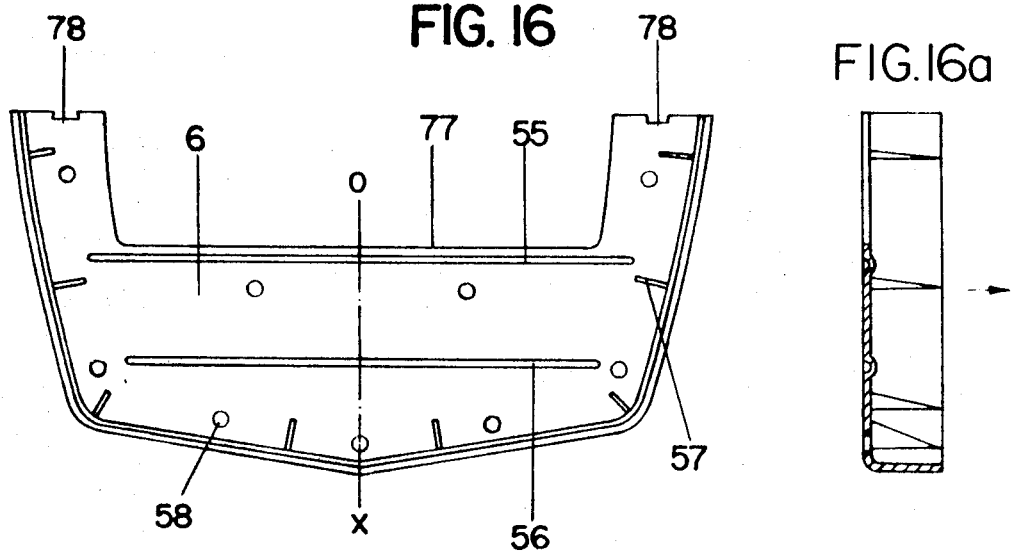
FIG. 16
FIG. 16a
FIG. 16b Oct. 12, 1971  A. R. GONZALEZ  3,611,458
BOAT CONSTRUCTION
Filed Sept. 3, 1969  12 Sheets-Sheet 7
FIG. 17
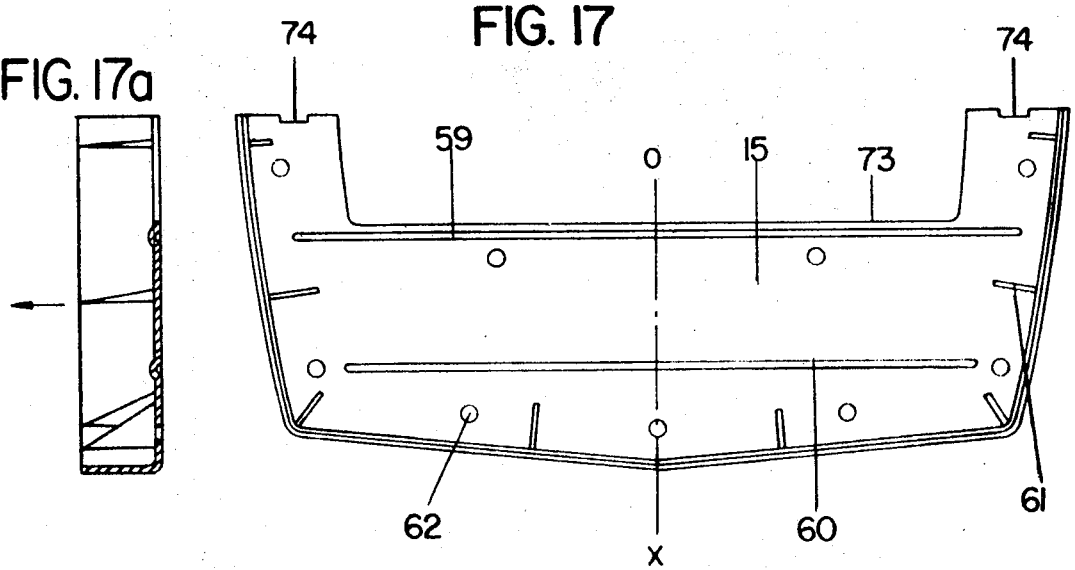
FIG. 17a
FIG. 17b
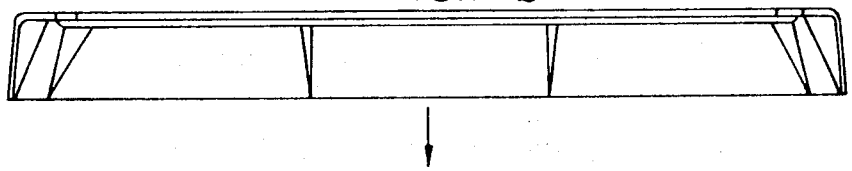
FIG. 18
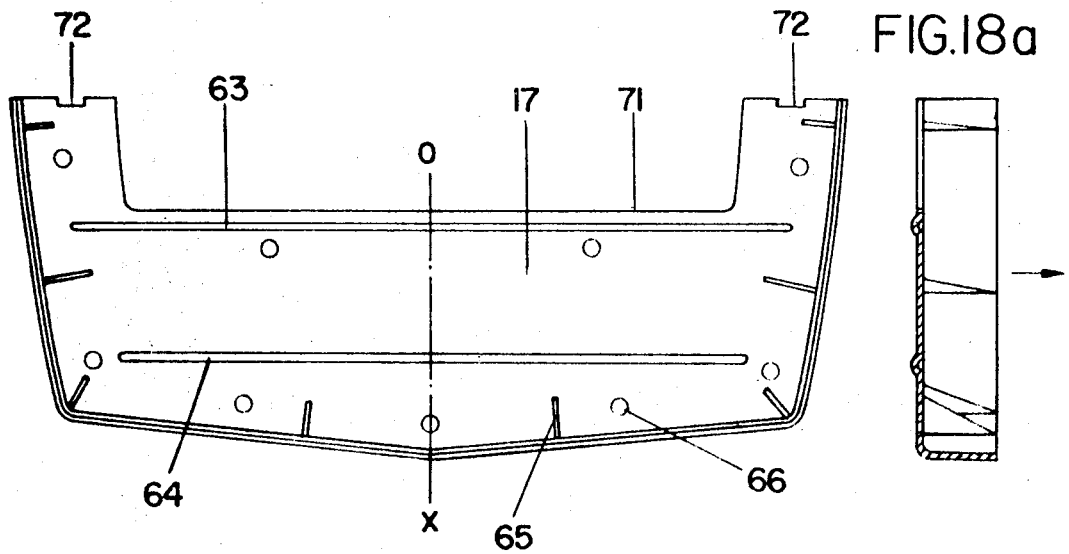
FIG. 18a
FIG. 18b
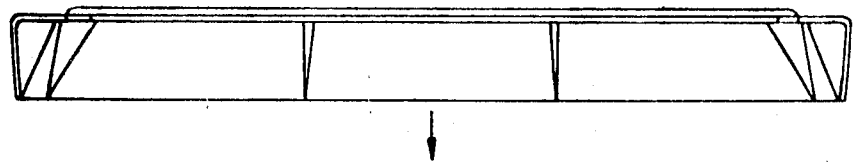

Oct. 12, 1971          A. R. GONZALEZ                3,611,458
                       BOAT CONSTRUCTION
Filed Sept. 3, 1969                              12 Sheets-Sheet 9
FIG. 22
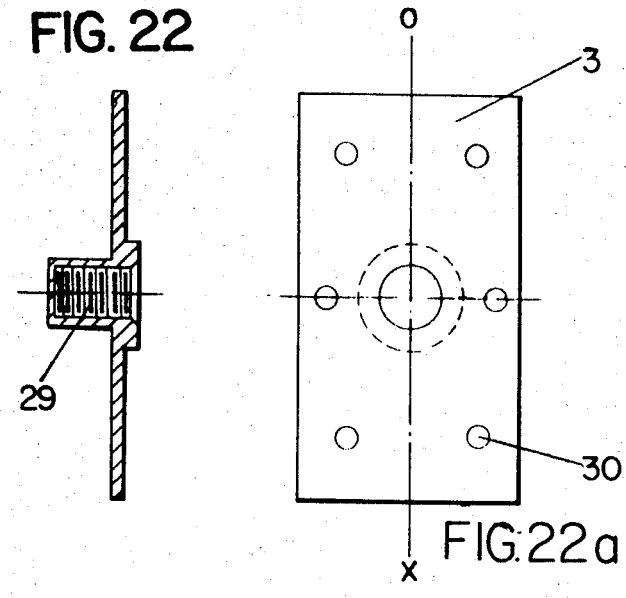
FIG. 23
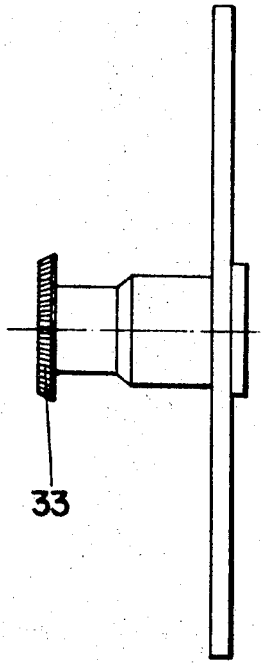
FIG. 23a
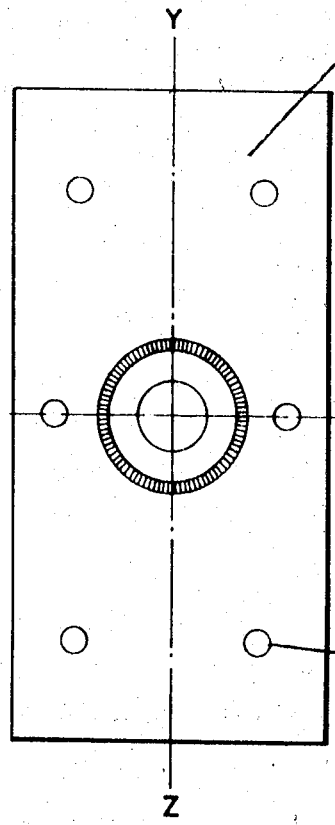
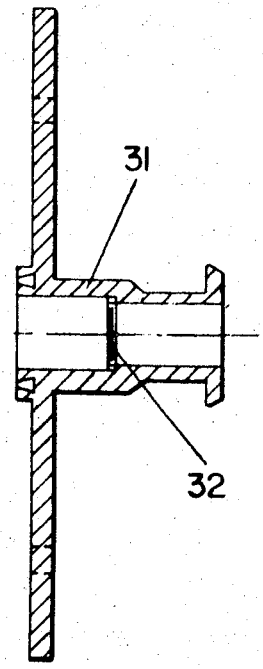
FIG. 23b Oct. 12, 1971   A. R. GONZALEZ   3,611,458
BOOT CONSTRUCTION
Filed Sept. 3, 1969   12 Sheets-Sheet 10
FIG. 24
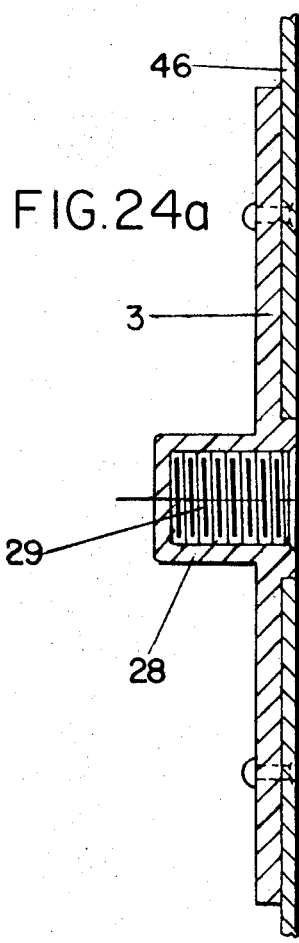
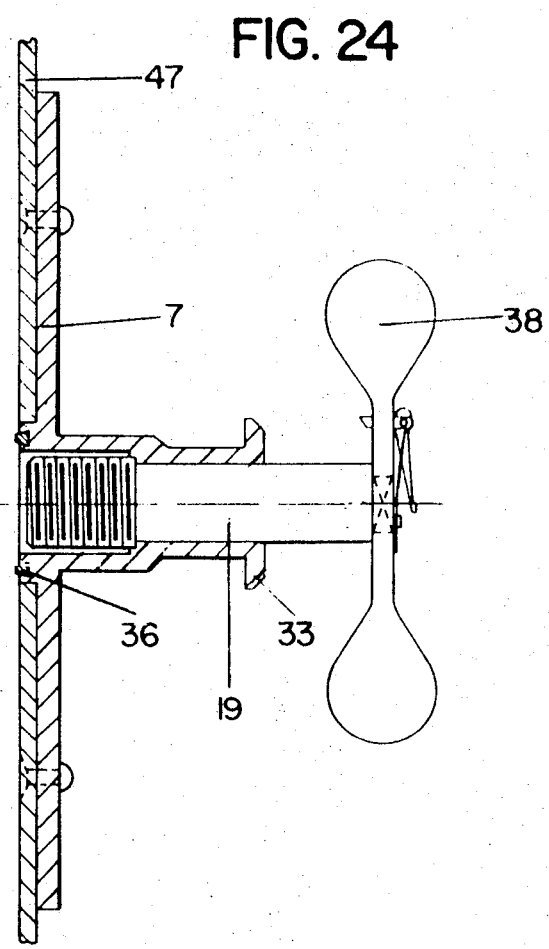
FIG. 24a
FIG. 25
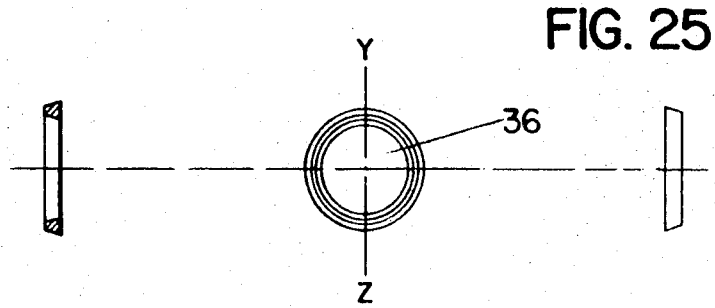
FIG. 26
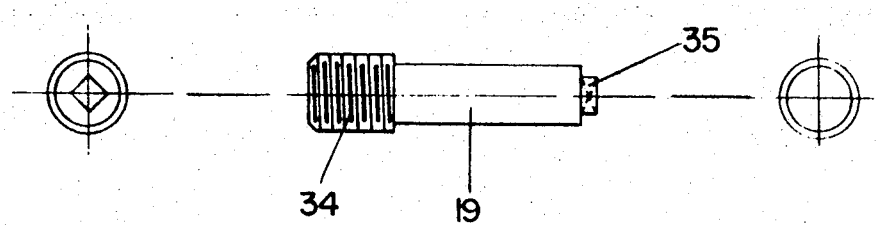

Oct. 12, 1971    A. R. GONZALEZ    3,611,458
BOAT CONSTRUCTION

Filed Sept. 3, 1969    12 Sheets-Sheet 11

Oct. 12, 1971  A. R. GONZALEZ  3,611,458
BOAT CONSTRUCTION

Filed Sept. 3, 1969  12 Sheets-Sheet 12

United States Patent Office 3,611,458
Patented Oct. 12, 1971

3,611,458
BOAT CONSTRUCTION
Alvaro Rodriguez Gonzalez, Urbanizacion San Martin, Bloque 4, Apto. E-6, Caracas, Venezuela
Filed Sept. 3, 1969, Ser. No. 854,828
Claims priority, application Spain, Sept. 3, 1968, 357,796
Int. Cl. B63b 7/04
U.S. Cl. 9—2
9 Claims

ABSTRACT OF THE DISCLOSURE

An easily transportable boat having the strength, seaworthiness and general appearance of conventional craft consists of a plurality of individual, watertight hull portions which when assembled form the boat and when disassembled may be nested one within the other to conserve storage space. Included in the hull modules are seats, some of which fold up to make room for the other hull modules during storage and transportation.

---

The present invention relates to a new and improved boat construction, and it relates more particularly to a modularized boat including a plurality of nestable hull portions which are adapted to be assembled together to complete the craft.

It can be affirmed that nautical sport, and with reference to navigation with small crafts with four and a half metre ram or of greater length, is only carried out by persons who have the economic resources allowing them:

(1) A certain economic freedom to buy the craft.
(2) An automobile with trailer to transport the boat.
(3) Housing with a suitable place for storing the trailer and boat.
(4) The second and third paragraphs can be resolved by the boat owner leaving it in the aquatic area under the care of some paid person.

The above mentioned points determine the following problems:

(a) Troublesome work, full of complications for transporting this type of craft from the user's house to the aquatic area where it is to be used, and vice versa.
(b) Need to dispose of a house having the necessary commodity for being able to store the trailer and boat.
(c) As a result of the vibrations in transport, the structure of the boats transported on trailers deteriorates or becomes loose.

In short, it can be said that the practice and dedication to nautical sport, using small boats, can only be carried out by persons with sound economic resources. The same occurs in respect of persons who use boats for sport fishing, or need to use a mixed means of locomotion, to call it such, on having to leave the vehicle and cross aquatic areas.

So as to resolve the above difficulties, and problems and possess a boat which can easily be transported and which, besides its low price, occupies a very small space, the inventor has devoted several years of his life studying the problem thus presented.

A principal object of this invention is, therefore, to provide a boat construction which can be easily erected and dismantled, and when erected, has sailing characteristics similar to those of the usual small crafts, and which, when dismantled, occupies a very small space, and is of the lightest possible weight.

Another object of this invention is to provide a modularized boat construction with a resistance to transversal and longitudinal strain of the hull superior to that corresponding in similar crafts.

A further object of the invention is to provide a boat which, as a result of its mass manufacture, has as low a sales price to the public as possible.

To resolve the objects noted above, numerous sketches were drawn of both the hull and the various components which would form an integral part of the boats to be made. Later, and after many calculations, the plans were drawn up to obtain a prototype which would serve as pilot model for building boats of larger and smaller sizes proportional to same.

As a result of the last paragraph, a prototype boat was made with modular units which could be dismantled and fitted inside each other, comprising the central body, stern and prow, together with all the accessories and complements necessary in this type of construction, so as to make up a complete marine monoblock which can be dismantled.

The basis of the invention proposed is founded on the creation of a boat preferably made up of three modular units appearing in the same hull, having the suitable structure for forming the line of the craft and which are joined and coupled to each other by means of suitable fixing and fastening means, allowing it to be dismantled at the appropriate moment.

As has been mentioned above, these modular units are made up of the prow body, which receives a unit with triangular shape and curved sides and is placed in the upper part of this body so as to shape the prow deck, whilst in approximately the middle part of same, the partition bulkhead is installed for housing the core and deck support, which consists of a laminar contour unit which corresponds with the hollow part of this area and has a large number of circular hollows alleviating it of weight and at the same time a rectangular unit, fixed with screws, which allows it to be taken out and assembled, together with a flatbar which, girthing all its edge, gives a seat area for assembly in the prow body.

The second modular unit, known as the central body, has a bulkhead coupled in the junction area with the module of this name, made up of an angular laminar unit with contour similar to the module which receives it. Its shape resembles a U, having an upper central notch, and two grooves, one in each wing of the figure, together with reception borings, horizontal ribs and stiffener squares which give this unit great strength and which correspond in the union of the two modular bodies, prow and central, with another bulkhead of the same characteristics as those described, fitted at the rear end of the prow body, the only difference being that the rib folding is contrary to the opponent bulkhead, such that when both support units are in contact, the ribs of a bulkhead fit into those of the other, consolidating the installation.

This central body has a second bulkhead at the rear, known as prow, which follows the internal line of the hull, of an angular laminar shape, and is fitted with the corresponding fixing orifices, upper central notch, grooves in each wing of the figure and stiffening squares together with the horizontal ribs which complete the structure of this unit.

The third and last basic modular part is made up of the stern body, fitted with a bulkhead known as prow, of identical characteristics as the above, with the sole variation in its contour for coupling in the corresponding hull and the device of the horizontal ribs which are joined in the opposite direction to those of the opponent bulkhead, placed in the central body part of the stern, so they fit in them when the coupling of both units is being made. This stern unit also has a second bulkhead frame of angular laminar structure. The contour corresponds to the inside of the body into which it fits, central notching of smaller dimension than the ones described above, stiffener squares and horizontal ribs which give the unit a strong resistance for supporting the outboard motor pressure and that of the wooden stern frame supporting same.

The stern module has a seat with its corresponding support legs which are fixed in specially adapted places in the stern frame of the central body, and can be folded upwards on the stern body; remaining in the internal part of the bulkhead of this area in horizontal position in respect of same. In turn, the central body is also fitted with a collapsible seat and support legs which are fixed on the corresponding hull. They fold downwards when the circumstances so require.

Finally, the stern body possesses a third seat, fixed at the back of this hull, and has a cavity which enables the stern body keel to be easily introduced in the fitting of the three modular bodies.

The coupling and fixing device of the three modular bodies which make up the so-called boat, are formed in a plurality of female guide hook units and male guide hook units, all of a rectangular shape with borings for fixing on the bulkheads. Those known as "females" differ in that at the top they have the form of a double fork, whereas those known as "males" have at the top, two side prolongations which are inserted in the forks of the opponent units in the installation of the three mentioned elements, all being coupled and fixed in the notched area of the bulkheads and the "female" guides being placed in the corresponding prow and stern ones of the central body, and the "male" guides, respectively, in the prow bulkhead of the stern body and in the stern bulkhead of the prow body.

The above fixing units of the essential bodies of the boat are completed with a large number of base nut units, made up of a rectangular flange with reception borings and a blind cylinder fitted with interior worm, which couple with other fixed guide units, also of rectangular shape with fixing boring and a cylindrical prolongation with axial passing boring in which there is a worm winding which enables the bolts, fitted in them, to be screwed to same when the system is dismantled, the end contrary to the seating flange being fixed with fluted disk.

All the above is completed with cylindrical supporting bolts fitted with worm and square head, in which a butterfly type lever is fitted, which facilitates the tightening and loosening operation of same and the corresponding O-ring seals of trapezoidal section which guarantee the sealing of the union of all the units.

The safety system adopted by the invention for the immobility of the bolts which materialize the union of the three modular bodies, includes a series of ratchets made up of a gudgeon unit, which crosses an orifice in each butterfly and enmeshes with the fluted disk of the fixed guides, an operation lever and an antagonist spring, which drives this ratchet, all fixed to the central part of the butterfly type levers.

The complementary parts of the boat are not taken into account in this description as they are common to all boats, such as: bow, keel, longitudinal reinforcements of the starboard and port edges, the sheer rail, lining and wood of the stern frame.

Further objects and advantages and a better understanding of the present invention may be had by reference to the following detailed description taken in connection with the accompanying drawings, wherein.

Figure 1:
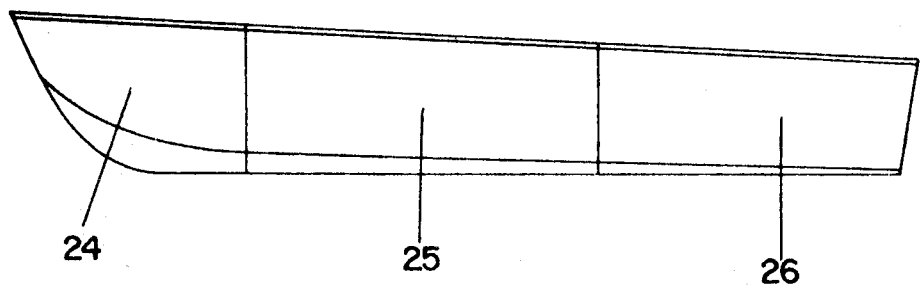
FIG. 1 is a front longitudinal view of a boat embodying the present invention.
Figure 2:
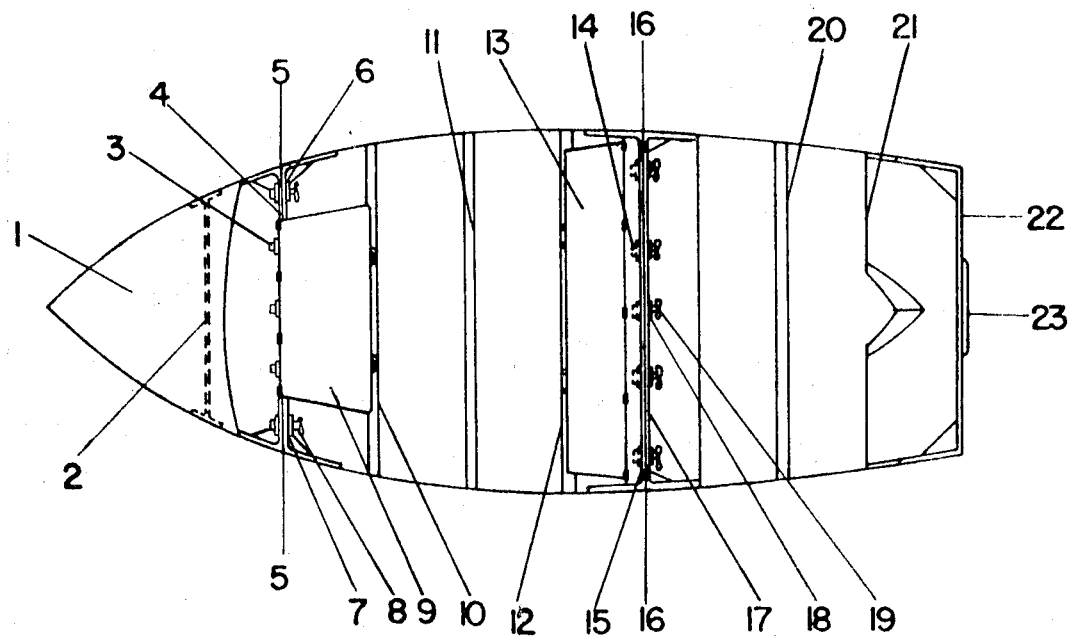
FIG. 2 is a view of the top of the boat of FIG. 1.
Figure 3:
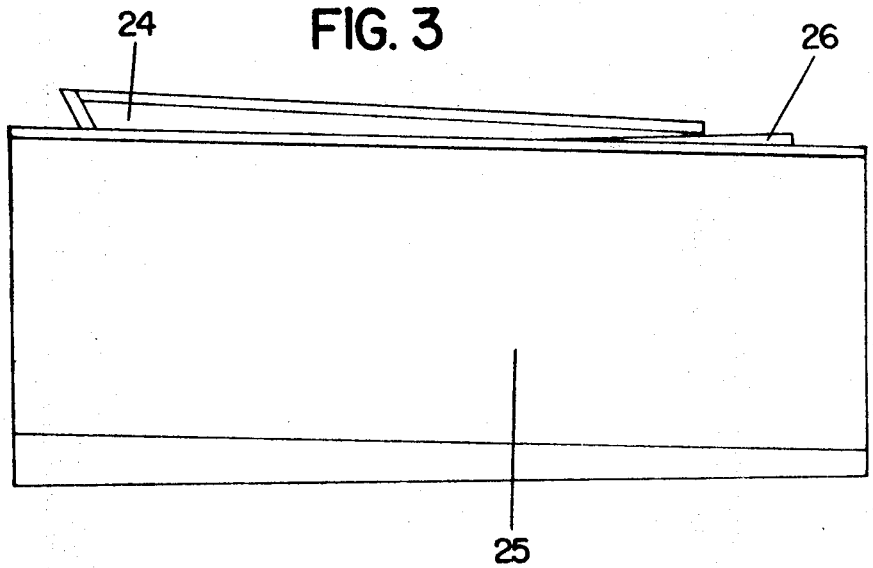
Figure 4:
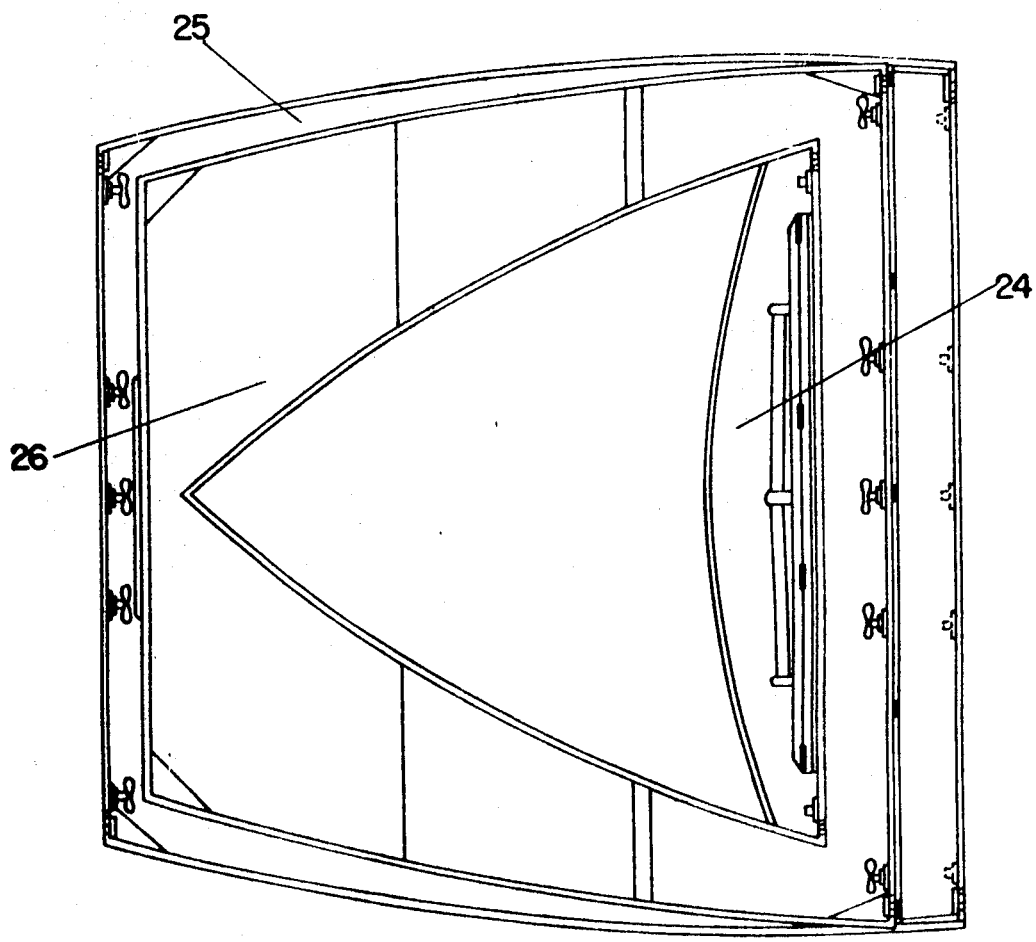
Figure 5:
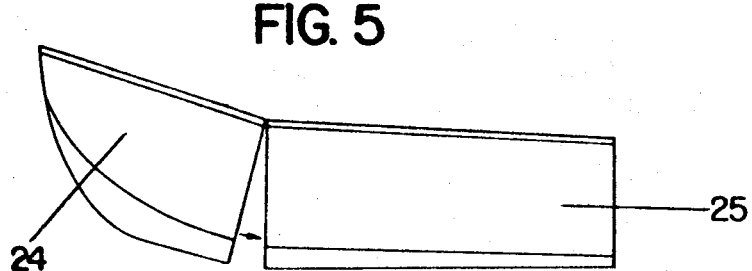
Figure 6:
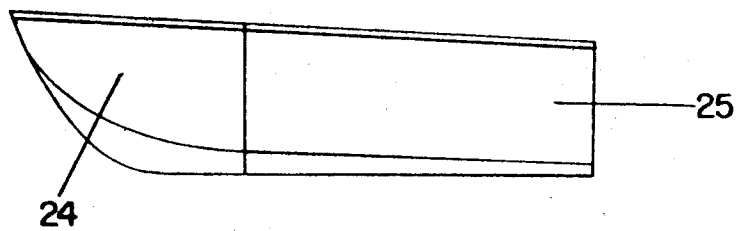
Figure 7:
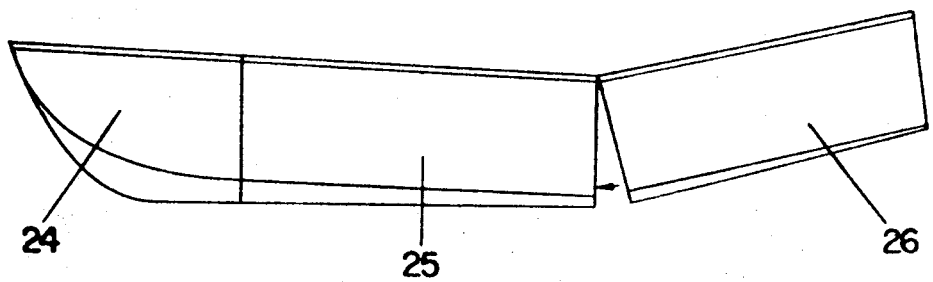
Figure 8:
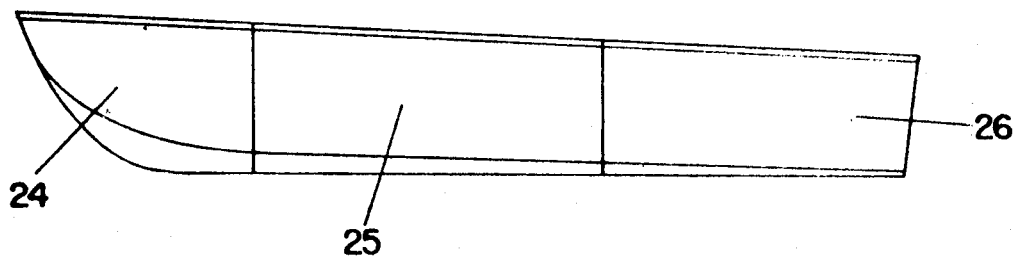
Figure 9:
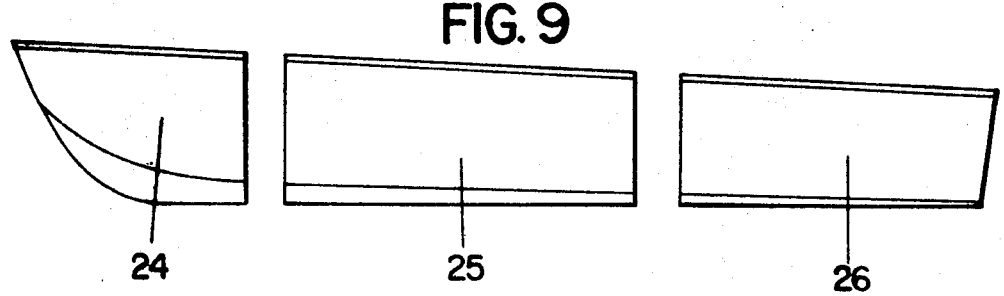
Figure 10:
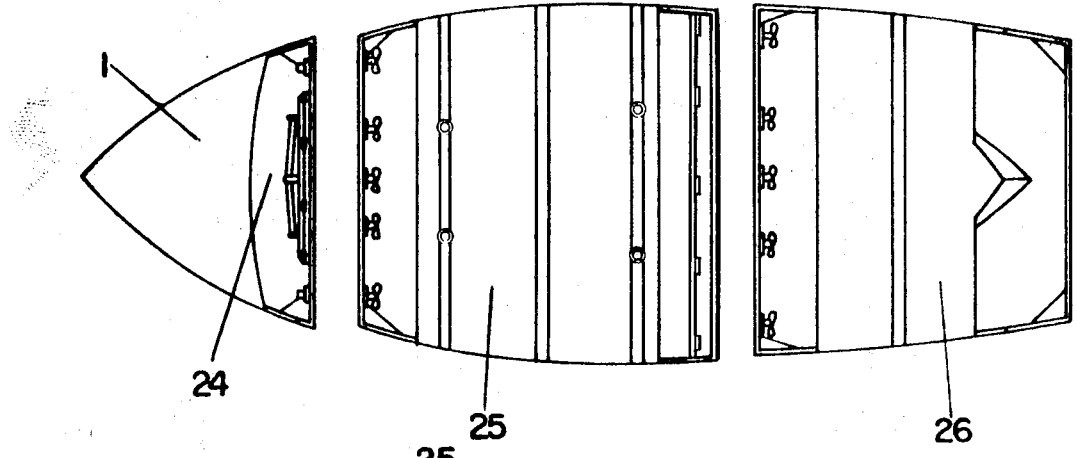
Figure 11:
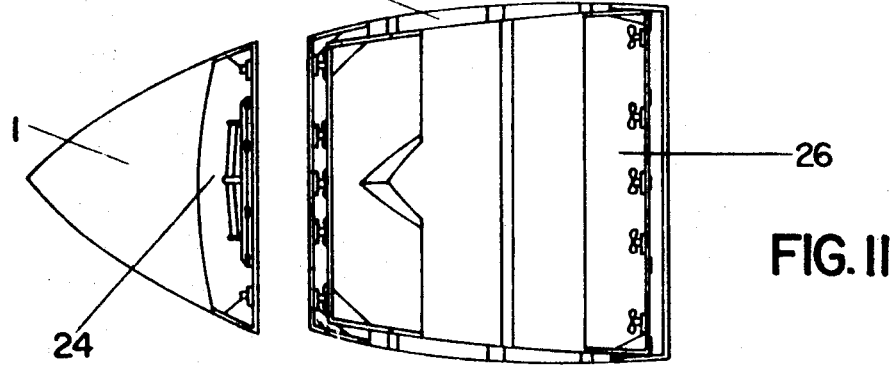
Figure 12:
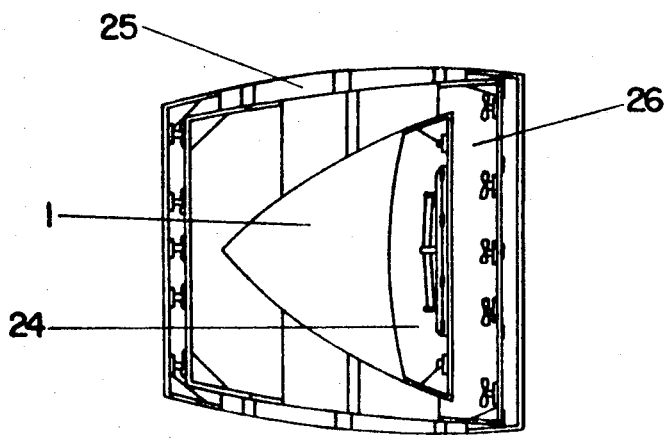
Figure 13:
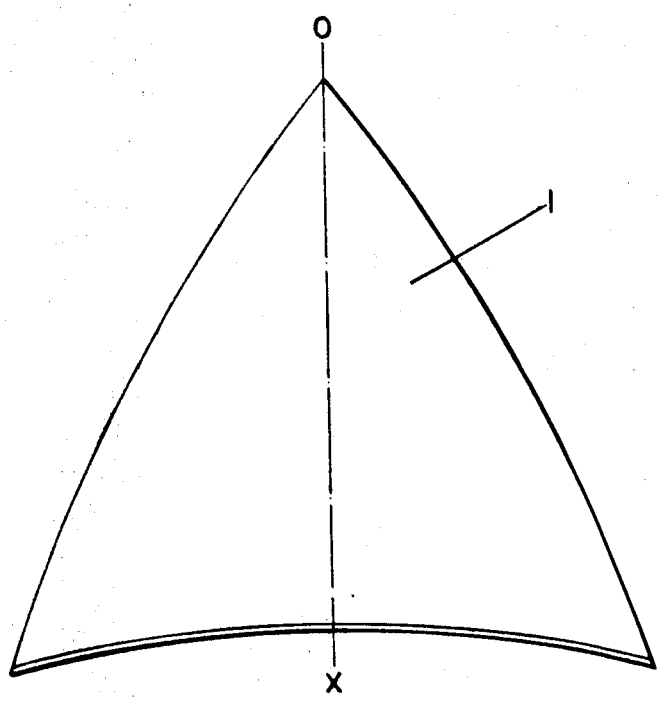
Figure 13A:
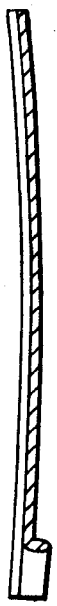
Figure 14:
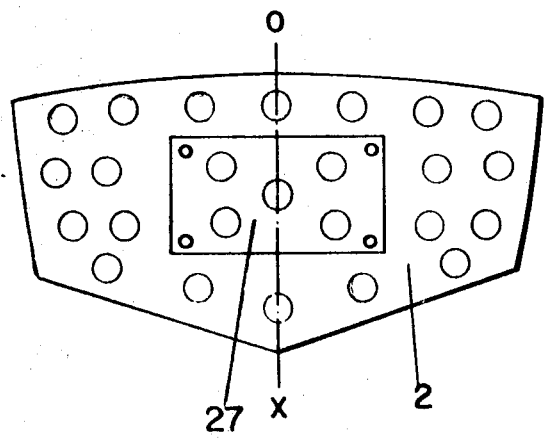
Figure 14A:
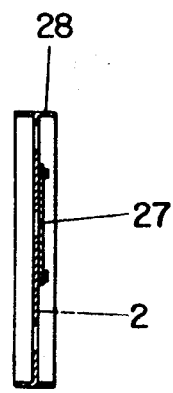
Figure 19:
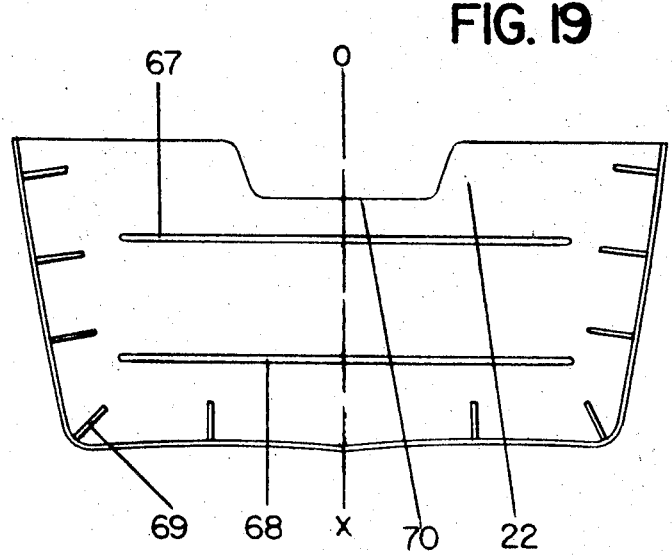
Figure 19A:
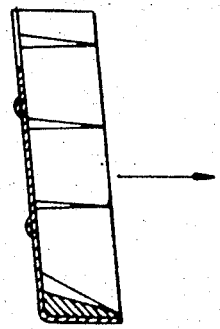
Figure 19B:
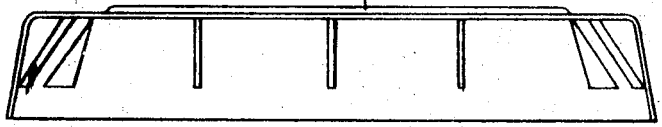
Figure 20:
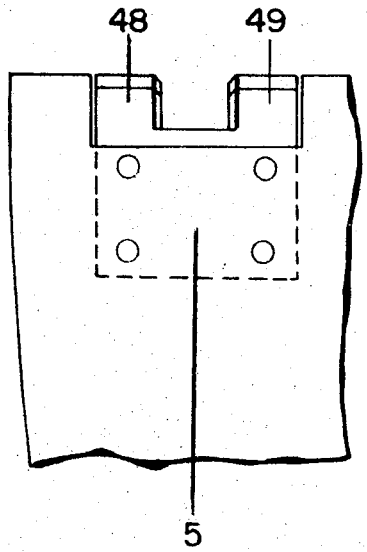
Figure 20A:
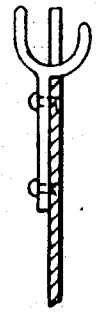
Figure 21:
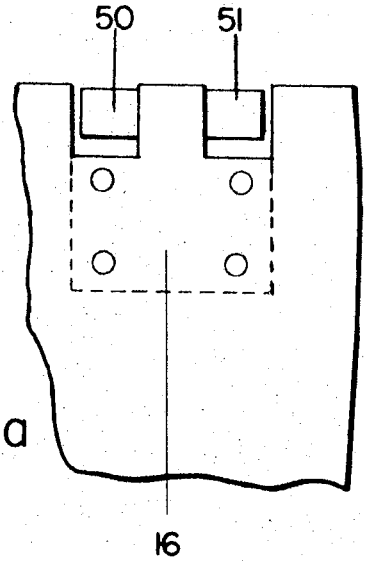
Figure 27:
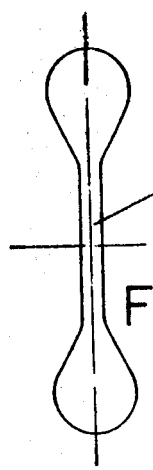
Figure 27A:
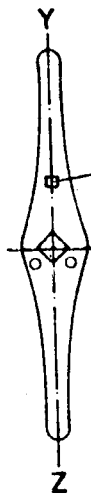
Figure 27B:
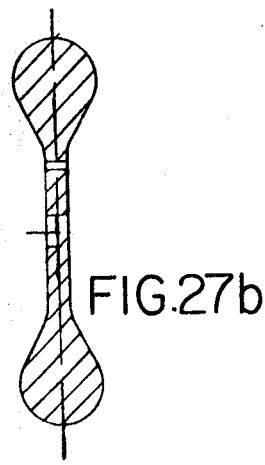
Figure 28:
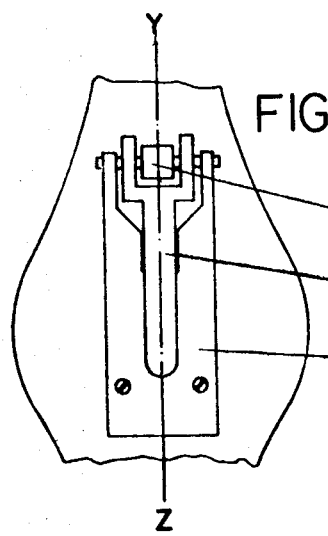
Figure 28A:
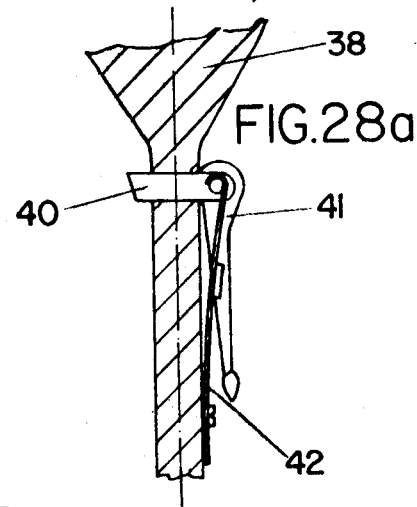
Figure 29:
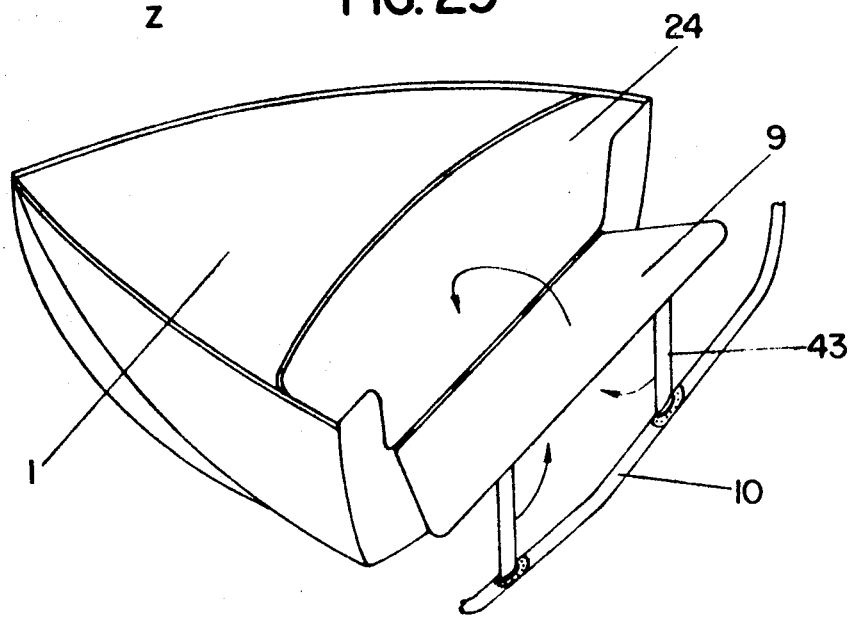
Figure 30:
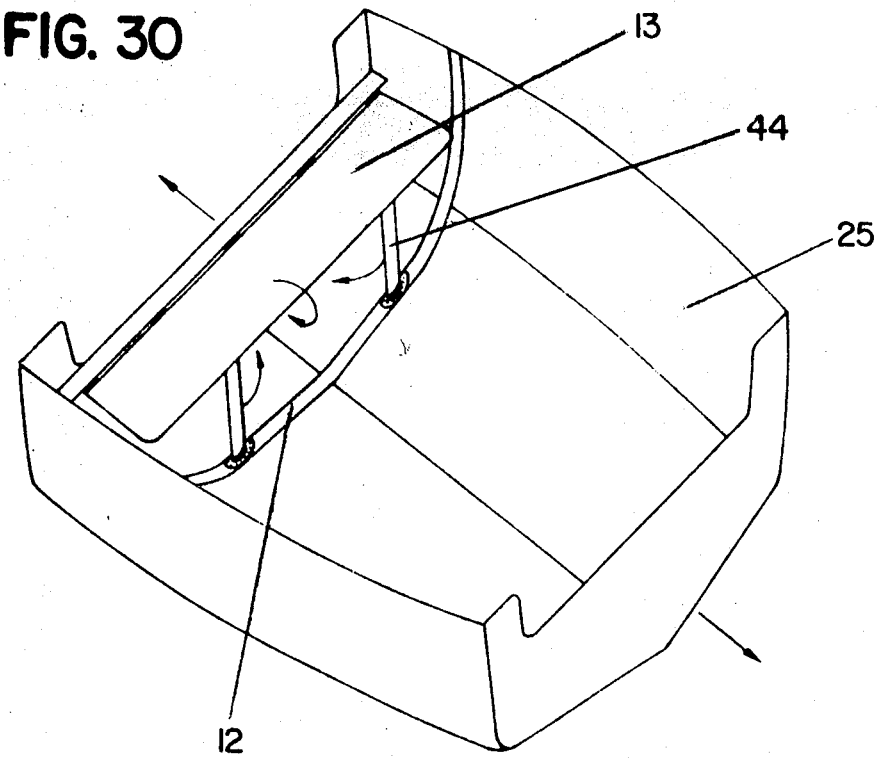
Figure 31:
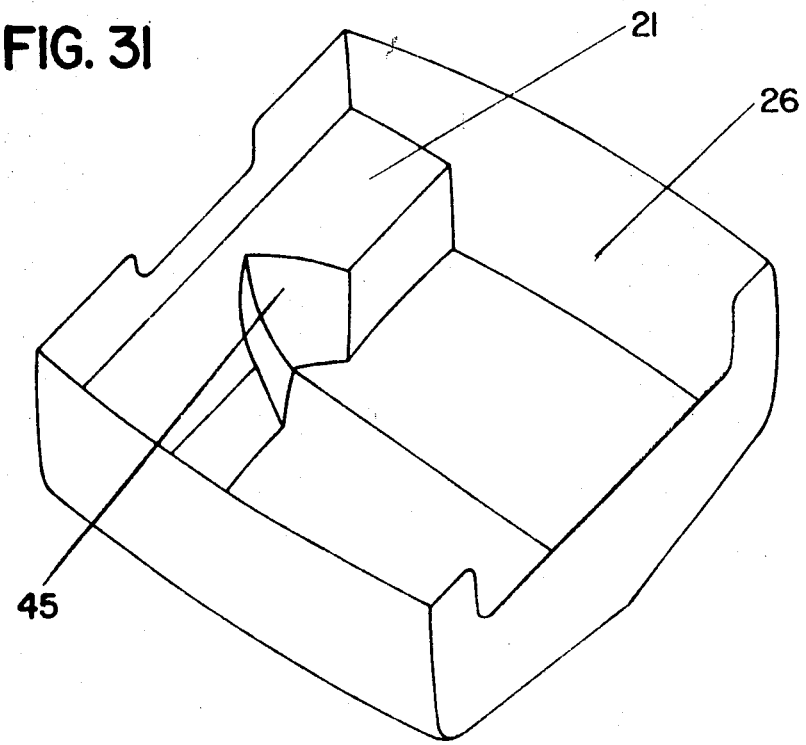

FIGS. 3 and 4 respectively show the boat dismantled and its modular units fitted, from front and top;

FIGS. 5, 6, 7 and 8 in turn illustrate the installation process of the three units;

FIGS. 9, 10, 11 and 12 show the dismantling process and fitting of the three basic units;

FIGS. 13, 13a and 14, 14a respectively show the prow deck and partition bulkhead of this area;

FIGS. 15, 15a, 15b, 16, 16a, 16b, 17, 17a, 17b, 18, 18a, 18b and 19, 19a, 19b are respectively views in three projections, of the stern bulkhead of the prow body, prow bulkhead of the central body, stern bulkhead of the central body, prow bulkhead of the stern body and stern frame bulkhead of the same body;

FIGS. 20, 20a and 21, 21a illustrate the female guide-hook units and the male guide-hook units installed on the corresponding notches of the bulkheads;

FIGS. 22, 22a, 22b and 23, 23a, 23b respectively show in two views and one section, the base nut unit and the fixed guide unit;

FIGS. 24 and 24a show in section the coupling of both units in the corresponding bulkheads and the locking between them through the fixing bolts;

FIGS. 25 and 26 respectively represent the O-ring seal of trapezoidal section and a fixing bolt according to three views;

FIGS. 27, 27a and 27b a representation with two views and a section of the butterfly type lever;

FIGS. 28 and 28a show in detail the safety device in a top view and a longitudinal cut; and FIGS. 29, 30 and 31 illustrate in conventional perspective, the three modular bodies, prow, central and stern, so as to show the seats which these units possess.

In accordance with the figures enclosed, by way of an illustrative but not limitative example, the craft embodying the present invention is basically made up of three modular bodies 24, 25 and 26, which respectively are known as prow body, central body and stern body, and are joined by means of the female guide-hook units 5 and the male guide-hook units 16, all of a rectangular shape and with borings for fixture on the bulkheads; the first differ from the second in that the former have the form of a two prong fork, whereas the latter have two lateral prolongations 50 and 51 which are inserted in the prongs of the female units.

These coupling units, which allow articulation and freedom from the fundamental bodies, are complemented with a number of base nut units 3 of rectangular constitution, with reception borings 30 and are fitted with a cylindrical prolongation 28 with interior blind screwed emptying 29 which joins with various other fixed guide parts 7, also of rectangular shape, by means of fixing borings 37 and have a cylindrical part 31 with axial passing boring in which there is a screw winding 32, ending on the opposite side to the rectangular flange with a fluted disk 33.

The body of the prow 24 has a unit 1 on top, with triangular shape and curved sides, which is joined by means of rivets, welding or any other known process, constituting the prow deck, whilst approximately in the middle of this deck is the partition bulkhead 2 whose purpose is to provide a compartment in this area for housing the core and supporting the deck. This bulkhead consists of a laminary contour unit which corresponds with the interior contour of the receiver unit and has a large number of circular hollows which alleviate it of weight. It also has a rectangular unit 27 fixed with screws which enables it to be dismantled or fitted in accordance with the circumstances of the moment, together with a flatbar 20 which, lining all its edge, affords a seating area for its installation in the prow body.

As joint elements between this module and the central body there are two bulkheads, known respectively as stern of the prow body and prow of the central body 4, 6 (FIGS. 15 and 16) both made up of an angular laminar unit of contour similar to the modules into which they fit, and which have a shape resembling a U, with a central upper notching 75, 77 and two grooves 76, 78, one on each wing of the figure, together with reception bores 54 and 58, horizontal reinforcement ribs 52, 55 and 56 and stiffener squares 53 and 57 which give these units a high resistance for supporting the great strains which the boat is subject to during navigation.

The bulkheads described differ from one another in that the folding of the horizontal ribs are contrary so that when both parts are in contact, the ribs of one bulkhead fit inside those of the other, consolidating the union.

The central body in the rear area or stern has a bulkhead 15 which corresponds with another similar one 17 fitted in the stern prow of the stern module. They both also make up an angular laminar unit with upper central notching 71 and 73 fixing orifices 62 and 56, notches in each wing of the figures 72 and 74, stiffener squares 61 and 65, and horizontal ribs 59 and 63 which complete the structure of these units, which also differ from one another in the folding of the horizontal ribs which are contrary, so that in the contact of both joint units, they fit into each other, reinforcing the coupling and installation of same.

The stern body also has a bulkhead known as stern frame 22 of angular laminar structure, contour which corresponds with the corresponding interior to the body into which it fits, central notching of smaller dimension than the above 70, stiffener squares 69 and horizontal ribs 67 and 68 which give the unit a strong resistance for supporting the strains of the outboard motor which is placed on the wooden stern frame 23.

The three modular bodies described have seats, with names corresponding in accordance with their position: the stern seat 9 is fitted with support legs 43 which are fixed in suitable places on the hull 10 and can be folded upwards on the stern body in accordance with the directions marked in FIG. 29. The seat of the central body 13 also has support legs 44 which rest on the frame marked as 12 and can be folded downwards according to the direction of the arrows in FIG. 30. Finally, the stern body has a fixed seat 21 which has a cavity 45 for the easy introduction of the keel of the prow body, in the fixture of the three fundamental bodies making up the boat.

The female guide-hook units are coupled in the corresponding notches of the stern and prow bulkheads to the central body whereas the male guide-hook units are arranged in the notches of the prow bulkhead of the stern body and in the stern bulkhead of the prow body.

On the other hand, the parts which fix all the partition bulkheads of the boat 3 and 7 are fixed to same by means of riverting and are facing, as is shown in FIG. 24 where, in an arbitrary way, numbers have been given, 46 and 47, to two of these bulkheads to distinguish them from these units. Note that they are complemented with the O-ring seal of trapezoidal section 36 which guarantees the tightness of the union, which is materialized by means of bolts 19 whose screwed part 34 screws into zone 29 of unit 3.

To facilitate the tightening and loosening operation of the fixing bolts, they have a square head 35 on which a butterfly type lever 38 is coupled, which is fitted with a safety device made up of a solidary gudgeon 40 of a lever 41 and an antagonist spring 42. This all constitutes a ratchet system which impedes the mobility of the draught and screwed bolts in their respective places on the gudgeon 40 entering into the orifice 39 and enmeshing with the fluted disk 33, locking and blocking the system. The operation of the lever 41 upwards releases the locking and allows the bolts to be loosened so as to proceed with the dismantling of the modules.

COUPLING OF THE THREE MODULAR BOAT UNITS

Bearing in mind that, to initiate the coupling of the three fundamental bodies, they are inserted inside each other, that is to say, the stern body 26 is inserted inside the central body 25 and the prow body 24 is inserted inside the latter—details and particulars of which can be observed in FIGS. 3 and 4. Firstly, the stern body is taken out and hooked on the central body by means of the guide-hook units described above. Next, the first unit is swivelled downwards until it touches the prow bulkhead of the central body. Once this operation has been done, the bolts can be screwed in their corresponding fixture units, and the prow body is perfectly joined to the central body. Next, the same operations are carried out with the stern body, whose parts which have to make contact, once they are facing, remain fixed and solidary, thanks to the bolts which materialize the union.

Next, the prow seat is unfolded, turning it on its hinges until the horizontal position is reached and its legs are fixed in the place which the corresponding hull has for this purpose. The central seat is then unfolded, turning it on its hinges, upwards until the horizontal position is reached and its legs are fixed in the place which the corresponding hull has for this purpose.

To grasp and suspend the boat so as to carry it to the water, the port and starboard rails of the sheer, all the way along, have a special profile which allows the hands to easily adapt. This profile also largely prevents water from entering along the upper part of the boat, when this is sailing and water splashes in certain external parts of the hull.

DISMANTLING AND INSERTION OF THE THREE MODULAR BOAT UNITS INSIDE EACH OTHER

After the bolts which join the stern body with the central body have been unscrewed and these bodies have been unhooked and separated, the bolts which join the stern body to the central one should be unscrewed and both unhooked and separated.

To set out clearly and simply the way in which the bodies are fitted inside each other, FIGS. 9, 10, 11 and 12 illustrate this operation in which the following should be explained:

(1) The seat of the prow part folds on the prow body. Two thirds of the width of the central seat fold downwards, the remaining third being immovable. Once the indicated steps have been effected with the seats, the space necessary for inserting the central stern body is free.

(2) The stern seat is immovable and has a shape such that apart from offering an ample space as a seat for two persons, its central part includes a V-shape void so that the prow can fit in it and not slip towards the sides when the boat is being transported.

(3) Neither the bolts nor any other part of the boat prevents the bodies from nesting in one another, as is shown in the sketches which are enclosed.

Having thus described the nature and scope of the present invention, and also the form of being able to practice same, it is herein stated that, the materials, forms, dimensions and in general, all those accessory and secondary details which do not alter, change or modify the proposed essentialities can be variable in it.

What is claimed is:

1. A boat of the type formed of a plurality of modular hull portions detachable from and nestable in one another, said portions including a prow, a central body and a stern body and having bulkhead portions positionable against one another when said portions are in the assembled condition, comprising interlocking means mounted at the tops of said bulkheads for pivotally connecting said hull portions together, each of said means including a first member fastened to the bulkhead on one of said hull portions and a second member, interlockable with and separable from said first member, fastened to the adjacent bulkhead on the next adjacent hull portion, and connecting means mounted by said bulkheads near the bottoms thereof for holding adjacent ones of said bulkheads tightly together.

2. A boat according to claim 1 wherein said prow has a rear bulkhead said central portion has a forward bulkhead, and
said bulkheads are in juxtaposition when said hull portions are interconnected.

3. A boat according to claim 2 wherein is provided
a generally triangular prow deck suitably fixed across the top of said prow hull portion, and
a seat pivotally attached to the rear bulkhead of said prow hull portion for pivotal movement between a storage position within said prow and an erected position where it fits into the forward portion of said central hull portion.

4. A boat according to claim 3 wherein said seat is provided with legs which fit into recesses in said central hull portion.

5. A boat according to claim 2 wherein each of said hull portions is provided with a foldable seat, and
said stern hull portion has a rear seat having a central V-shaped recess for receiving the forward end of said prow hull portion when said hull portions are nested.

6. A boat according to claim 2 wherein said bulkheads are provided with aligned apertures for receiving bolts which hold said portions in assembled relationship.

7. A boat according to claim 2 comprising a plurality of resilient gaskets sealingly interposed between said hull portions.

8. A boat according to claim 1 wherein a plurality of transverse ribs in said central and stern hull portions, the respective ribs in adjacent ones of said hull portions being disposed alongside one another when said hull portions are interconnected to form said boat.

9. A boat as set forth in claim 1 wherein the stern one of said hull portions has an external size smaller than the interior of the central one of said hull portions so as to be nestable therein,
a stern seat in said stern hull portion having a V-shaped forwardly opening notch therein, the walls of said notch diverging in an upward direction, and
the prow one of said hull portions has an external size smaller than the interior of said stern portion and being nestable therein with the prow thereof conforming to and fitting in said notch with the forward portion of said prow being supported by the walls of said notch.

References Cited

UNITED STATES PATENTS

| | | | |
|---|---|---|---|
| 1,527,089 | 2/1925 | Shipley | 9—2 |
| 1,575,982 | 3/1926 | Ferris | 9—2 |
| 2,212,088 | 8/1940 | Tomassi | 9—2 |
| 2,339,782 | 1/1944 | Johnson | 9—2 |
| 2,422,930 | 6/1947 | Rutledge | 9—2 |
| 2,443,767 | 6/1948 | House | 9—2 |
| 2,443,768 | 6/1948 | House | 9—2 |
| 2,457,010 | 12/1948 | Thedick | 9—2 |
| 2,650,376 | 9/1953 | Sommer | 9—2 |
| 2,977,607 | 4/1961 | Roblee | 9—2 |
| 3,266,067 | 8/1966 | Windle | 9—2 |
| 3,381,332 | 5/1968 | Cook | 9—7 X |

MILTON BUCHLER, Primary Examiner

C. A. RUTLEDGE, Assistant Examiner